United States Patent [19]

Schultz, Jr.

[11] 4,002,081
[45] Jan. 11, 1977

[54] PULLEY CONSTRUCTION

[75] Inventor: Edward H. Schultz, Jr., Glencoe, Ill.

[73] Assignee: Nagel-Chase Manufacturing Company, Chicago, Ill.

[22] Filed: Jan. 12, 1976

[21] Appl. No.: 648,248

[52] U.S. Cl. .............................. 74/230.8; 29/159 R
[51] Int. Cl.² .................. F16H 55/44; F16H 55/49
[58] Field of Search ................ 74/230.8, 230.3; 29/159 R

[56] References Cited
UNITED STATES PATENTS

| 2,196,923 | 4/1940 | Johanson | 74/230.8 |
| 2,741,134 | 4/1956 | Bagley | 74/230.8 |
| 3,599,503 | 8/1971 | Schultz, Jr. | 74/230.8 |
| 3,722,310 | 3/1973 | Schultz, Jr. | 74/230.8 |

Primary Examiner—Samuel Scott
Assistant Examiner—A. Russell Burke
Attorney, Agent, or Firm—Olson, Trexler, Wolters, Bushnell & Fosse, Ltd.

[57] ABSTRACT

A pulley is disclosed which comprises a hub, a firmly resilient collar affixed to the hub, and first and second annular sheet metal members surrounding the collar. The first annular sheet metal member has an outwardly flared margin and bushing portion which engages the collar outer surface with an axially extending press fit. The second annular sheet metal member has an outwardly flared margin adapted to oppose the first sheet metal member margin so as to form a groove for accommodating a belt. A bi-ended sleeve extends from this second member margin and is adapted to engage the first member bushing with an extended, nesting fit. A groove section is formed at the free sleeve end for accommodating a second belt. A radially inwardly extending free bushing end is adapted to engage a groove in the collar to further assist in securing the first sheet metal member to the collar. Additional collar-first member interengagement is provided by a number of lugs which extend radially inwardly from the first member bushing. Tabs extend radially outwardly from the first member bushing for engaging recesses in the second member sleeve to pin the first member to the second member in a rigid pulley unit.

11 Claims, 4 Drawing Figures

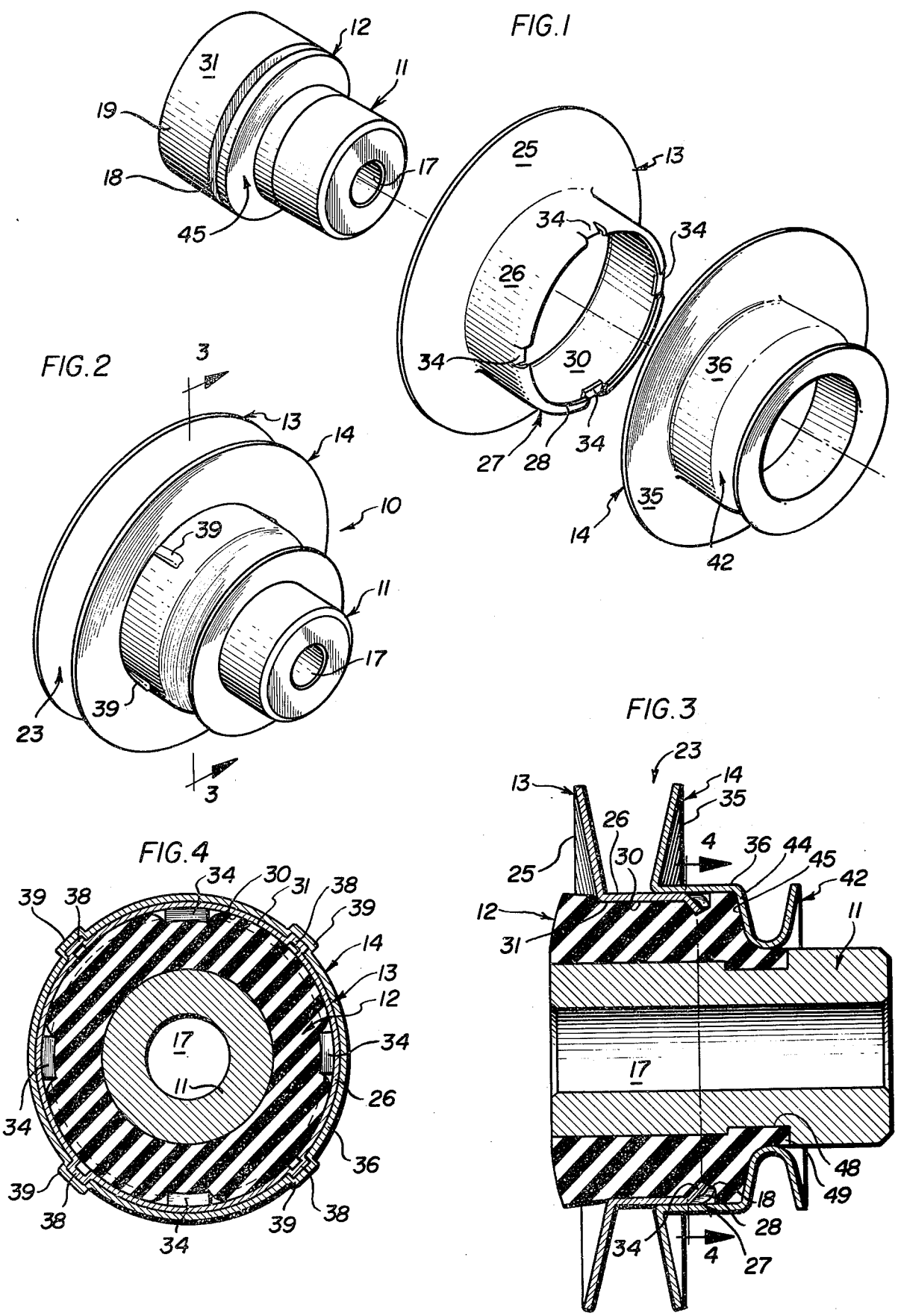

PULLEY CONSTRUCTION

BACKGROUND OF THE INVENTION

This invention relates generally to pulleys or sheaves and more particularly concerns a pulley or sheave which can be inexpensively constructed, which accommodates more than one belt, and which minimizes noise and vibration during its operation.

Pulleys or sheaves assembled from hubs and one or more sheet metal parts have provided commercially successful solutions to the problem of constructing a sheave or pulley which operates quietly and which can be constructed inexpensively. Some of these pulleys are disclosed and claimed in U.S. Pat. Nos. 3,599,503 and 3,722,310.

It is the general object of the present invention to provide a rugged pulley for use with a plurality of belts which is made of relatively light weight, inexpensively produced parts at minimal finished cost.

A related object is to provide such a pulley which can be relatively easily assembled, yet which is constructed so as to encourage a long service life.

Another related object is to provide a pulley construction especially adapted for use with two belts in applications where quiet operation is important.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is an exploded perspective view showing the parts comprising the novel pulley assembly;

FIG. 2 is a perspective view showing the pulley as it appears when fully assembled;

FIG. 3 is a sectional view of the pulley shown in FIG. 2 taken substantially in the plane of line 3—3 in FIG. 2; and FIG. 4 is a sectional view taken substantially in the plane of line 4—4 in FIG. 3.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning more specifically to the embodiment of the invention shown in the drawings, a pulley 10 constructed in accordance with the invention can be broadly considered to include a hub 11, a firmly resilient collar 12 affixed to the hub 12, a first annular sheet metal member 13, and a second annular sheet metal member 14.

The hub 11 can be formed from stock steel by machining or other known construction methods in accordance with the requirements described below. A central hub bore 17 accepts a shaft or other desired machine elements (not shown) and can be secured to such shaft as by a key, a set screw device or other structure (also not shown).

The collar 12 is molded or otherwise formed upon one end of a hub 11. To reduce pulley operating noise, this collar is formed of a firmly resilient material such as synthetic rubber of known variety having a Shore "A" hardness on the order of 50. Selection of this collar-forming material depends, of course, upon the chemical and mechanical environment in which the assembled pulley ultimately will be used. To assist in retaining the sheet metal members 13 and 14 upon this collar 12 and the hub 11 in accordance with the invention, an annular groove 18 is formed in an outer collar surface 19.

To define one constituent part of a first belt-accommodating pulley groove 23, the first annular sheet metal member 13 is formed, at one end, with an outwardly flared margin 25. This margin 25 is formed, by stamping or other known forming methods, to flow smoothly into a bi-ended bushing portion 26 extending axially from the flared margin 25 to a free end 27. To firmly secure this first annular sheet metal member 13 to the collar 12 at low cost but with a rigid interconnection in accordance with the invention, the free end 27 extends radially inwardly and is adapted for engagement with the collar groove 18. In the illustrated embodiment, this inward extension takes the form of a rolled annular shoulder 28. In keeping with the invention, the inner diameter of this bushing portion 26 and the outer diameter of the resilient collar 19 are mutually sized so that the bushing inner surface 30 engages the collar outer surface 31 with an axially extending press fit.

In further accordance with the invention, the aggressive interengagement of this first sheet metal member 13 with the collar 19 is enhanced by a plurality of lugs 34 extending radially inwardly from the bushing 26. Manufacturing costs can be minimized and effectiveness insured by forming these lugs 34 adjacent the bushing free end 27.

The second sheet metal member 14 is formed of a metal stock similar to that used for formation of the first member 13, and likewise includes an outwardly flared portion 35 and a bi-ended sleeve portion 36 axially extending from the flared margin 35. The second member margin 35 is adapted to oppose the first member margin 25. Together, these margins 25 and 35 comprise the first belt groove 23 described above. The sleeve portion 36 is sized so as to engage and mate with the first sheet metal member bushing 26 with an axially extending, nesting fit. To enhance the rigidity of the finally assembled pulley, as can be envisioned from reference to FIG. 3, this sleeve 36 can be sized to fit over the bushing 26 with a press fit.

To further enhance the rigid, positive assembly of the pulley, a number of tabs 38 (see FIG. 4) are formed on the first member bushing 26 so as to extend radially outwardly from the bushing 26 and pin or stake the first member 13 to the second member 14 in a rigid unit. These tabs 38 can be received in accommodating recesses 39 formed in the second member sleeve 36. Again, to minimize manufacturing costs, the tabs 38 can be formed at the free end of the bushing 26, and the lugs 34 and tabs 38 can be spaced apart from each other and from one another at substantially equiangular positions around the bushing 36.

To accommodate a second belt, the second member sleeve 36 terminates in a radially inwardly extending groove 42 having an appropriate cross-sectional shape. To further enhance the interengagement of the sheet metal member 14 directly with the collar 12, the second member sleeve 36 extends beyond the bushing free end 27 to directly engage the collar 12 with a press fit, as can be seen in FIG. 3. Further, one radially inwardly extending surface 44 of this sleeve-terminating groove 42 is formed to abuttively engage a generally conical terminating surface 45 of the collar 19.

To further firmly mate the collar 12 with the hub 11 and to provide for some slight motion of the second belt groove 42 during pulley operation, the hub 11 is provided with a radially inwardly extending groove 48 into which a shoulder portion 49 of the collar 12 fits at a location axially aligned with the second belt groove 42. This shoulder portion provides a resilient foundation for the second belt groove 42 and also enhances the interengagement of the first and second sheet metal members and the collar with the hub.

The invention is claimed as follows:

1. A pulley, comprising the combination of a hub, a firmly resilient collar affixed to the hub and having an annular surface having a groove formed therein, a first annular sheet metal member having an outwardly flared margin and a bi-ended bushing portion axially extending from the flared margin to an annular, radially inwardly extending free end adapted for engagement with the collar groove, the bushing having an inner surface for engaging the collar outer surface with an axially extending press fit, the pulley further comprising a second annular sheet metal member having an outwardly flared margin adapted to oppose the first sheet metal member margin and form therewith a groove for accommodating a belt, and a bi-ended sleeve portion axially extending from the flared margin and adapted to engage the first sheet metal member bushing with an axially extending, nesting fit.

2. A pulley according to claim including a plurality of lugs extending radially inwardly from said first member bushing for engaging the collar and enhancing the aggressive interengagement of the first member with the collar.

3. A pulley according to claim 2 wherein said lugs are formed adjacent said bushing free end.

4. A pulley according to claim 2 including tabs formed on said first member bushing extending radially outwardly from the bushing for pinning said first sheet metal member to said second sheet metal member in a rigid unit.

5. A pulley according to claim 4 wherein said tabs are formed at said free end of said bushing.

6. A pulley according to claim 5 wherein said lugs and said tabs are spaced apart from each other and from one another at substantially equi-angular positions around the bushing.

7. A pulley according to claim 4 wherein said second member sleeve is provided with recesses for accommodating said tabs to further assist in pinning said first sheet metal member to said second sheet metal member in a rigid unit.

8. A pulley according to claim 1 wherein said second member sleeve extends beyond the free end of said first member bushing to directly engage said collar with a press fit.

9. A pulley, comprising the combination of a hub, a firmly resilient collar affixed to the hub and having an annular outer surface having a groove formed therein, a first annular sheet metal member having an outwardly flared margin and a bi-ended bushing portion axially extending from the flared margin to an annular, radially inwardly extending free end adapted for engagement with the collar groove, a bushing inner surface for engaging the collar outer surface with an axially extending press fit, and a second annular sheet metal member having an outwardly flared margin adapted to oppose the first sheet metal member margin and form a groove for accommodating a first belt, a bi-ended sleeve portion axially extending from said flared margin so as to form a free sleeve end, said bi-end sleeve portion adapted to engage the first sheet metal member bushing with an axially extending, nesting fit, and a groove section formed at the free sleeve end for accommodating a second belt.

10. A pulley according to claim 9 wherein said firmly resilient collar is provided with a conical terminal surface, and said groove section formed at the free end of said sleeve is formed to mate with said collar terminal surface to enhance the interengagement of said first and second sheet metal members with said resilient collar.

11. A pulley according to claim 9 wherein said hub is provided with a recessed groove, and said collar is provided with a radially inwardly extending shoulder adapted to mate with said groove, the collar shoulder engaging the hub groove at a location axially aligned with the second member belt-accommodating groove.

* * * * *

UNITED STATES PATENT AND TRADEMARK OFFICE
CERTIFICATE OF CORRECTION

PATENT NO. : 4,002,081
DATED : January 11, 1977
INVENTOR(S) : EDWARD H. SCHULTZ, JR.

It is certified that error appears in the above-identified patent and that said Letters Patent are hereby corrected as shown below:

Column 3, line 33, after "claim" insert --1--

Signed and Sealed this

Seventeenth Day of May 1977

[SEAL]

Attest:

RUTH C. MASON
*Attesting Officer*

C. MARSHALL DANN
*Commissioner of Patents and Trademarks*